United States Patent [19]

Inukai

[11] 4,447,017

[45] May 8, 1984

[54] SEATBELT WEBBING RETRACTING DEVICE

[75] Inventor: Mitsuo Inukai, Nagoya, Japan

[73] Assignees: Toyota Jidosha Kogyo Kabushiki Kaisha; Kabushiki Kaisha Tokai-Riki-Denki-Seisakusho, both of Aichi, Japan

[21] Appl. No.: 249,478

[22] Filed: Mar. 31, 1981

[30] Foreign Application Priority Data

Mar. 31, 1980 [JP] Japan .............................. 55-42534[U]

[51] Int. Cl.³ ...................... A62B 35/02; B65H 75/42; B65H 75/48
[52] U.S. Cl. ............................ 242/107.4 A; 280/806; 297/478; 297/480
[58] Field of Search ................. 242/107.4 A, 107.4 B, 242/107.4 C, 107.4 D, 107.4 E, 107.4 R, 107; 280/806; 297/476, 478, 479, 480

[56] References Cited

U.S. PATENT DOCUMENTS

| 3,077,324 | 2/1963 | Strickland, Jr. .......... | 242/107.4 B X |
| 3,531,061 | 9/1970 | Davies ........................... | 242/107.4 B |
| 3,970,266 | 7/1976 | Doin et al. ................ | 242/107.4 B X |
| 4,056,242 | 11/1977 | Herrmann ................. | 242/107.4 A X |

Primary Examiner—Stuart S. Levy
Assistant Examiner—Scott J. Haugland
Attorney, Agent, or Firm—Parkhurst & Oliff

[57] ABSTRACT

A main shaft is threadably coupled to a base mounted on a vehicle body, and this main shaft is biased by a spring in the axial direction thereof. However, the main shaft is prevented from rotating by an arm tiltably supported on the main shaft being engaged with a stopper provided on the base. In an emergency of a vehicle, an acceleration sensor turns the arm to slip off the stopper to make the main shaft rotatable, whereby the main shaft rotatingly moves in the axial direction thereof. This moving force is transmitted to the webbing, whereby the webbing is retracted, so that the webbing can be closely fastened to an occupant.

10 Claims, 6 Drawing Figures ns 4,447,017

SEATBELT WEBBING RETRACTING DEVICE

BACKGROUND OF THE INVENTION

1. Field of the Invention

This invention relates to a seatbelt webbing retracting device for retracting a webbing fastened to an occupant in an emergency of a vehicle, used in a seatbelt system for protecting the occupant in an emergency of the vehicle.

2. Description of the Prior Art

In general, a webbing is fastened to an occupant by a seatbelt system, whereby the webbing restrains the occupant in an emergency of a vehicle, so that the occupant can avoid colliding with dangerous protrusions. The webbing is wound at one end thereof into a retractor and constantly subjected to a tension of a retracting force of the retractor. However, the windup force is made to be a comparatively weak biasing force for the purpose of obviating an oppressive feeling of the occupant. Hence, there is formed a clearance space between the webbing and the occupant, and, there has been pointed out such a disadvantage that, in the case that a takeup shaft of the retractor is locked to restrain the occupant in an emergency of vehicle such as a collision, the restraint to the occupant by the webbing becomes unsatisfactory until the aforesaid clearance space is decreased, thereby unabling to obtain a satisfactory restraining effect to the occupant by the webbing.

Because of this, such a device has been proposed that the webbing is retracted by use of an explosive force of gunpowder or the like in an emergency of the vehicle. However, in the case that a danger is caused by use of the gunpowder, it is difficult to control the explosive force of the gunpowder and it is impossible to reuse the device.

SUMMARY OF THE INVENTION

The present invention has been developed to obviate the abovedescribed disadvantages and has as its object the provision of a seatbelt webbing retracting device capable of reliably retracting the webbing without using an explosive force of a gunpowder as retracting force and of reusing.

The seatbelt webbing retracting device according to the present invention is of such an arrangement that an arm is caused to detach a stopper through the action of an acceleration sensor in an emergency of the vehicle, a main shaft provided thereon with the arm is biased in the axial direction thereof, the main shaft is rotatingly moved through the threadable connection between the main shaft and a base, and the moving force of the main shaft is imparted through transmitting means as a retracting force of the webbing to the webbing.

Description will hereunder be given of embodiments of the present invention with reference to the drawings.

DESCRIPTION OF THE PREFERRED EMBODIMENTS

Figure 1:
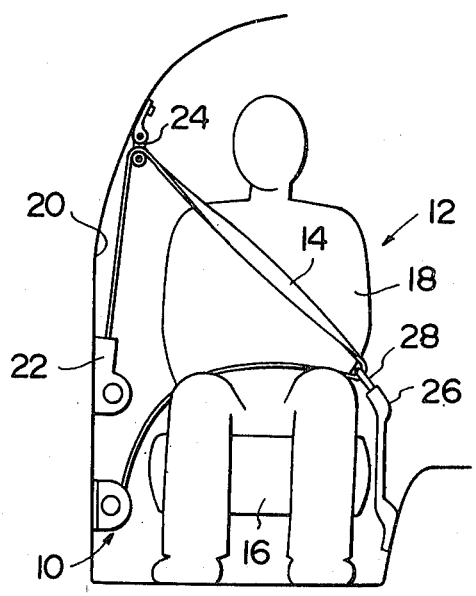
FIG. 1 is a front view showing the seatbelt system, to which is applied a first embodiment of the seatbelt webbing retracting device according to the present invention.

FIG. 1 shows a seatbelt system, to which is applied a seatbelt webbing retracting device 10 according to the present invention. In this seatbelt system 12, an occupant 18 seated on a seat 16 adapted to be restrained with a webbing 14, which is fastened at three points to a vehicle.

One end of the webbing 14 is wound up into a retractor 22 mounted on the intermediate portion of a side wall 20 of the vehicle, and the retractor 22 can windup the webbing 14 by a biasing force of a predetermined value and incorporates therein an inertial lock mechanism for instantly stopping the windoff of the webbing 14 in an emergency of the vehicle. The intermediate portion of the webbing 14 extended from the retractor 22 is turned back at a through ring 24 installed at the upper portion of a side wall 20 of the vehicle, and the webbing 14 passes over the seated occupant and is further turned back at a tongue plate 28 engaged with a buckle device 26 secured to the substantially central portion of the vehicle, and thereafter, wound up a seatbelt webbing retracting device 10 installed at the lower portion of the side wall 20 of the vehicle. Consequently, the occupant can be restrained only by engaging the tongue plate 28 with the buckle device 26.

Figure 2:
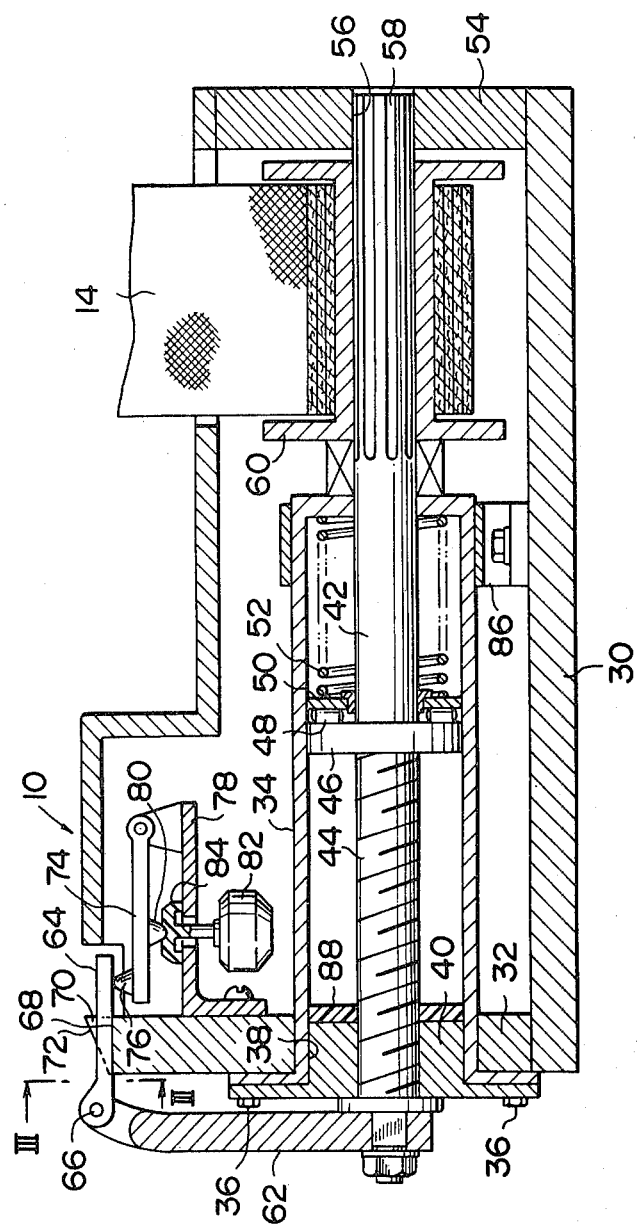
FIG. 2 is a sectional view showing the seatbelt webbing retracting device.

As shown in FIG. 2, the seatbelt webbing retracting device 10 is provided with a base plate 30 solidly secured to the side wall of the vehicle through a mounting bolt, not shown. At one end of the base plate 30 is an end plate 32. A cylinder 34, whose axis is in the horizontal direction, is solidly secured to the substantially central portion of the end plate 32 by means of a bolt 36. A nut is inserted in an inlet opening 38 of the cylinder 34. The nut is solidly secured to the end plate together with the cylinder 34. A main shaft 42 of the cylinder 34 is threadably engaged with the nut 40 at the external surface thereof. The external thread portion 44 is threadably engaged with the nut 40 with a comparatively large pitch, and when axially moved, the main shaft 42 is rotated by the threadable engagement.

The main shaft 42 is projectingly provided at the intermediate portion thereof with a collar 46, which is contiguous with a disk 50 through a needle thrust bearing 48. Interposed between the disk 50 and the bottom of the cylinder 34 is a compression coil spring 52, which is adapted to bias and move the main shaft 42 in the axial direction thereof.

The main shaft 42 is further extended through the bottom of the cylinder 34, and the forward end thereof is supported by a bearing in a hole 56 formed in an end plate 54 erected from an end portion of the base plate 30. On an outer surface of the main shaft 42 between the bearing hole 56 and the bottom of the cylinder 34 are splines 58, which are in meshing engagement with splines formed on the inner periphery of a takeup reel 60 to thereby constitute transmitting means for transmitting the rotation of the main shaft 42 to the takeup reel 60. An end portion of the webbing 14 is solidly secured to the takeup reel 60 and wound up in layers. Consequently, the takeup reel 60 and the main shaft 42 are axially relatively movable, and, when the main shaft 42 rotates, the takeup reel 60 rotates together therewith by means of the engagement of splines.

Figure 3:
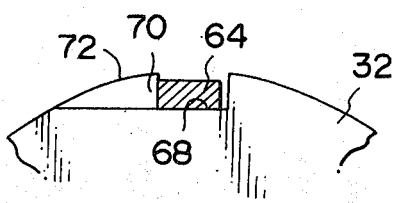
FIG. 3 is a sectional view taken along the line III—III in FIG. 2.

On the other hand, a set lever 62 is solidly secured to the forward end of the main shaft 42 projected from the nut 40, and adapted to rotate with the main shaft. An arm 64 is tiltably supported at the forward end of the set lever 62 around a pin 66. The arm 64 is relatively rotatable with the set lever 62. The arm 64 is inserted into a rectangular groove 68 formed in the top portion of the end plate 32 (Refer to FIG. 3), and comes into abutting contact with a side wall 70 of the rectangular groove constituting a stopper for restraining the movement of the arm 64, whereby a rotating force of the main shaft 42 is imparted to the end plate 32, so that the rotation of the main shaft 42 can be prevented. However, in the case that the arm 64 is tilted around the pin 66 in the counterclockwise direction from the position indicated in FIG. 2, the engagement between the arm 64 and the side wall 70 is disengaged, so that the arm 64 can make the main shaft 42 rotatable. In addition, as shown in FIG. 3, a triangular cutout 72 is formed on the outer peripheral portion of the end plate, which is contiguous to the rectangular groove 68, and when the arm 64 is tilted around the pin 66 up to an angle of a very small value, the engagement between the arm 64 and the side wall 70 can be disengaged.

The forward end portion of the arm 64 is projected through the end plate 32 to the other side, and rested on a projection of a pushup lever 74. The pushup lever 74 is tiltably supported on a bracket 78 secured to the end plate 32 through a screw.

Furthermore, a projection 80 projected from the undersurface of the pushup lever 74 is rested on a head 84 of a pendulum 82 suspended by the bracket 78. This pendulum 82 constitutes an acceleration sensor, that is, when the acceleration of the vehicle reaches a predetermined value, the pendulum 82 is turned to tilt the pushup lever 74, whereby the pushup force of the lever 74 is imparted to the arm 64 through a projection 76 of the pushup lever 74, so that the arm 64 can be tilted around the pin 66.

Additionally, in FIG. 2, a bracket 86 of the base plate 30 for preventing the deformation of the cylinder 34 is solidly secured to a portion adjacent the bottom of the cylinder 34, and a shock absorbing pad 88 is solidly secured to the rear surface of the nut 40 in the cylinder 34 so as to absorb the shock which may occur between the collar 46 and the cylinder 34.

Description will hereunder be given of operation of the embodiment with the abovedescribed arrangement. When the occupant engages the tongue plate 28 with the buckle device 26 upon being seated on the seat 16 as shown in FIG. 1, he can be restrained by the webbing 14. Furthermore, the retractor 22 makes it possible to wind off the webbing 14 during normal running condition of the vehicle, so that the occupant can desirably change his driving posture.

In an emergency of the vehicle such as a collision, the inertia lock mechanism incorporated in the retractor 22 is actuated to abruptly stop the windoff of the webbing 14, so that the occupant can be restrained by the webbing 14, thus enabling to secure the safety of the occupant. Further, in the emergency as described above, the pendulum 82 of the seatbelt webbing retracting device 10 shown in FIG. 2 is also tilted, whereby the pushup lever 74 tilts the arm 64 around the pin 66 to allow it to be disengaged from the side wall 70. By this, the set lever 62 becomes rotatable with the main shaft 42, whereby the biasing force of the compression coil spring 52 rotates and pushes the threaded portion 44 of the main shaft 42 out of the nut 40. The rotating force of the main shaft 42 is imparted to the takeup reel 60 through the splines 58, whereby the end portion of the webbing 14 is wound up to the takeup reel 60, so that a tension of the webbing 14 is increased. As a result that the webbing fastened to the occupant obtains a tension stronger than that during normal running condition of the vehicle, the occupant is brought into the restrained condition after the clearance space between the webbing and the occupant is eliminated, thereby further improving the safety of the occupant.

Additionally, an axial movement of the main shaft 42 when it rotatingly moves in the axial direction is absorbed by the relative movement between the splines 58 and the takeup reel 60 in the axial direction.

Furthermore, when the occupant is released from an emergency and when the seatbelt webbing retracting device 10 is assembled in, the occupant or worker rotates the set lever 62 to screw the main shaft 42 into the nut 40 and engages the arm 64 installed at the forward end of the set lever 62 with the rectangular groove 68, so that the seatbelt webbing retracting device 10 can be easily reset.

The seatbelt webbing retracting device 20 can be assembled into the retractor 22 by interposing a clutch mechanism for connecting the main shaft 42 to the takeup reel 60 in an emergency of the vehicle between the main shaft 42 and the takeup reel 60 in the abovedescribed embodiment. Furthermore, a slip-off preventing mechanism such as a leaf spring may be provided between the arm 64 of the set lever 62 and the rectangular groove 68, so that the arm 64 can be prevented from accidentally slipping off the rectangular groove 68.

Figure 4:
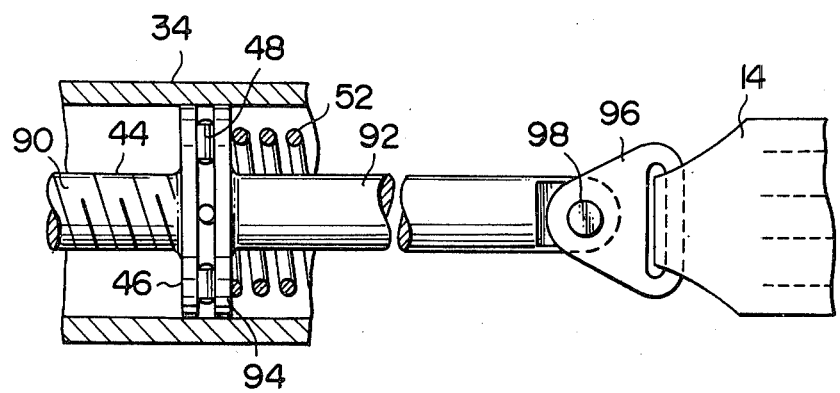
FIG. 4 is a sectional view showing the essential portions of a second embodiment of the present invention.

Next, FIG. 4 shows a second embodiment of the present invention, in which the main shaft is divided into two sections including a first main shaft 90 and a second main shaft 92. More specifically, the first main shaft 90 ends at the collar 46, while one end of the second main shaft 92 is solidly secured thereto with a collar 94, which is brought into contact with the collar 46 of the first main shaft 90 through a needle thrust bearing 48. The compression coil spring 52 is in abutting contact with this collar 94.

The other end of the second main shaft 92 is extended through the cylinder 34 and rotatably supports an anchor plate 96 through a pin 98. An end of the webbing 14 is fastened to the anchor plate 96.

Other parts not shown in the second embodiment are similar to those in the first embodiment, and, in an emergency of the vehicle, the first main shaft 90 rotatingly moves in the axial direction in the same manner as in the first embodiment, however, the second main shaft 92, being relatively rotatable to the first main shaft 90, moves only in the axial direction without rotating, whereby the end portion of the webbing 14 is moved by the moving force, so that the webbing 14 can be retracted.

Figure 5:
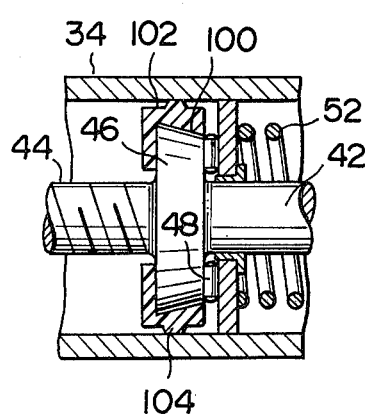
FIG. 5 is a sectional view showing the essential portions of a third embodiment of the present invention.

Next, FIG. 5 shows a self-locking mechanism of the main shaft. The collar 46 of the main shaft 42 is installed on the outer periphery thereof with a tapered portion 100. The tapered portion 100 is steeply tapered toward the bottom of the cylinder 34 (to the right in FIG. 5), and a cap 102 made of a synthetic resin material is crowned on the outer periphery of the collar 46 inside of the cylinder 34. The cap 102 is projectingly provided at the outer periphery thereof with a ring-like ridge 104, which is in contact with the inner peripheral surface of the cylinder 34. Others in the arrangement are similar to those in the first embodiment.

Accordingly, in the third embodiment, in the case the main shaft 42 is subjected to a force for moving it toward the bottom of the cylinder, the tapered portion 100 of the collar 46 presses the synthetic resin cap 102 against the inner surface of the cylinder, whereby the ridge 104 is strongly pressed against the inner peripheral surface of the cylinder 34, so that the main shaft 42 can be prevented from being reversely rotated and a frictional resistance between the ridge 104 and the cylinder 34 can be increased. After the main shaft 42 has rotated to render a tension to the webbing 14, the tension is adapted not to be relived or to be slowly relived.

Figure 6:
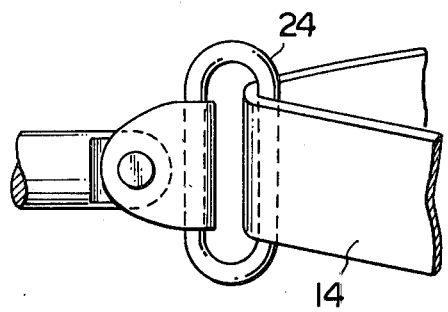
FIG. 6 is a front view showing the connected state of the through ring and the main shaft of a fourth embodiment of the present invention.

Next, FIG. 6 shows a fourth embodiment of the present invention, in which the second main shaft 92 of the second embodiment is solidly secured to the through ring 24. Consequently, in the fourth embodiment, tensions are rendered not only to the end portion of the webbing but also to the intermediate portion thereof, so that the webbing can be retracted to be closely attached to the occupant in an emergency of the vehicle.

Additionally, combination of a G sensor, a solenoid and the like may be used as an acceleration sensing means in place of the aforesaid pendulum.

As has been described hereinabove, the seatbelt webbing retracting device according to the present invention is of such an arrangement that an arm is engaged with a stopper of a base to prevent a main shaft from rotating and the arm is disengaged from the stopper through the action of an acceleration sensor, whereby the main shaft is allowed to rotatingly move in the axial direction thereof and the moving force of the main shaft is imparted as a force for retracting the webbing, and hence, can offer such outstanding advantages that necessity of use of gunpowder is eliminated, and a seatbelt webbing retracting device of simplified construction can be obtained and the device can be reused as necessary.

What is claimed is:

1. A seatbelt webbing retracting device for retracting a webbing fastened to an occupant in an emergency of a vehicle such as a collision so as to improve the performance of restraining the occupant, comprising:
   (a) a base mounted on a vehicle body;
   (b) a main shaft threadedly connected to said base;
   (c) a biasing means for biasing said main shaft in the axial direction of said main shaft;
   (d) transmitting means for transmitting a moving force of said main shaft generated by a biasing force of said biasing means to the webbing;
   (e) an engaging means comprising an arm tiltably supported on said main shaft and engageable with a stopper provided on said base to prevent said main shaft from rotating; and
   (f) an acceleration sensor for actuating said engaging means with respect to said main shaft to disengage said engaging means from said stopper so as to make said main shaft rotatable with respect to said base, whereby said main shaft is rotated and moved with respect to said base by said biasing force in the axial direction thereof, and said moving force is transmitted to the webbing through said transmitting means to thereby retract the webbing.

2. A seatbelt webbing retracting device as set forth in claim 1, wherein said transmitting means comprises: splines formed on one end portion of the main shaft; and internal splines formed on the inner periphery of a webbing takeup reel, engaged with said splines and axially movable with respect to said splines.

3. A seatbelt webbing retracting device as set forth in claim 1, wherein said main shaft is divided into two sections including a first main shaft and a second main shaft, characterized by: said first main shaft threadably connected to said base and biased in the axial direction thereof; and said second main shaft movable with the first main shaft, relatively rotatable with the first main shaft, engaged at one end portion thereof with the webbing and adapted to pull the webbing, when the first main shaft moves in the axial direction thereof, to thereby retract the webbing.

4. A seatbelt webbing retracting device as set forth in claim 1, wherein the other end of said webbing is wound into a retractor through an occupant restraining portion thereof, and said retractor incorporates therein an inertia lock mechanism for instantly stopping the windoff of the webbing in an emergency of the vehicle.

5. A seatbelt webbing retracting device as set forth in claim 1, wherein said base is solidly secured to a cylinder, through which the main shaft is extended, and a compression coil spring is confined between a collar of the main shaft and the bottom of the cylinder to bias the main shaft in the axial direction thereof.

6. A seatbelt webbing retracting device as set forth in claim 5, wherein interposed between said compression coil spring and a collar portion of the main shaft is a thrust bearing capable of allowing relative rotation between said compression coil spring and the collar portion of the main shaft.

7. A seatbelt webbing retracting device for rendering a tension to a webbing fastened to an occupant to closely fasten the webbing to the occupant in an emergency of a vehicle, used in a seatbelt system for protecting the occupant in an emergency of the vehicle such as a collision, comprising:
   (a) a base solidly secured to a vehicle body;
   (b) a cylinder solidly secured to said base and having mounted at an inlet opening thereof a nut;
   (c) a main shaft extended through said cylinder, provided at one end with a lever, formed at the other end portion with splines and provided at the intermediate portion thereof with threads being threadedly coupled to said nut;
   (d) a takeup reel adapted to wind up one end portion of the webbing, engaged with said splines, rotatable with the main shaft, and relatively movable in the axial direction;
   (e) a compression coil spring confined between the bottom of said cylinder and a collar provided on the main shaft to bias the main shaft in the axial direction thereof, to thereby rotatingly move the main shaft in the axial direction thereof;
   (f) an arm pivoted on said lever and being in abutting contact with a stopper to prevent the main shaft from rotating with respect to the base; and
   (g) an acceleration sensor for turning said arm with respect to the lever to make the main shaft rotatable in an emergency of the vehicle, so that the main shaft can rotatingly move in the axial direction thereof to rotate the takeup reel through the splines, thereby winding up the end portion of the webbing.

8. A seatbelt webbing retracting device for retracting a webbing fastened to an occupant in an emergency of a vehicle such as a collision so as to improve the performance of restraining the occupant, comprising:
 (a) a base mounted on a vehicle body;
 (b) a main shaft threadedly connected to said base
 (c) a biasing means for biasing said main shaft in the axial direction of said main shaft;
 (d) transmitting means for transmitting a moving force of said main shaft generated by a biasing force of said biasing means to the webbing;
 (e) an engaging means provided on said main shaft and engageable with a stopper provided on said base to prevent said main shaft from rotating; and
 (f) an acceleration sensor for actuating said engaging means with respect to said main shaft to disengage said engaging means from said stopper so as to make said main shaft rotatable with respect to said base, whereby said main shaft is rotated and moved with respect to said base by said biasing force in the axial direction thereof, and said moving force is transmitted to the webbing through said transmitting means to thereby retract the webbing, wherein said base is solidly secured to a cylinder, through which said main shaft is extended, a compression coil spring is confined between a collar of said main shaft and the bottom of said cylinder to bias said main shaft in the axial direction thereof, a thrust bearing capable of allowing relative rotation between said compression coil spring and a collar portion of said main shaft is interposed between said compression coil spring and said collar portion of said main shaft, and
 said cylinder is provided at an inlet opening thereof with a nut, which is threadedly coupled to said main shaft.

9. A seatbelt webbing retracting device for retracting a webbing fastened to an occupant in an emergency of a vehicle such as a collision so as to improve the performance of restraining the occupant, comprising:
 (a) a base mounted on a vehicle body;
 (b) a main shaft threadedly connected to said base
 (c) a biasing means for biasing said main shaft in the axial direction of said main shaft;
 (d) transmitting means for transmitting a moving force of said main shaft generated by a biasing force of said biasing means to the webbing;
 (e) an engaging means provided on said main shaft and engageable with a stopper provided on said base to prevent said main shaft from rotating; and
 (f) an acceleration sensor for actuating said engaging means with respect to said main shaft to disengage said engaging means from said stopper so as to make said main shaft rotatable with respect to said base, whereby said main shaft is rotated and moved with respect to said base by said biasing force in the axial direction thereof, and said moving force is transmitted to the webbing through said transmitting means to thereby retract the webbing, wherein said stopper is a side wall of a groove formed in the base, said engaging means is subjected to a biasing force for rotatingly moving said main shaft in the axial direction thereof, and said engaging means is to be brought into abutting contact with said side wall, whereby said main shaft is prevented from rotating.

10. A seatbelt webbing retracting device for retracting a webbing fastened to an occupant in an emergency of a vehicle such as a collision so as to improve the performance of restraining the occupant, comprising:
 (a) a base mounted on a vehicle body;
 (b) a main shaft threadedly connected to said base
 (c) a biasing means for biasing said main shaft in the axial direction of said main shaft;
 (d) transmitting means for transmitting a moving force of said main shaft generated by a biasing force of said biasing means to the webbing;
 (e) an engaging means provided on said main shaft and engageable with a stopper provided on said base to prevent said main shaft from rotating; and
 (f) an acceleration sensor for actuating said engaging means with respect to said main shaft to disengage said engaging means from said stopper so as to make said main shaft rotatable with respect to said base, whereby said main shaft is rotated and moved with respect to said base by said biasing force in the axial direction thereof, and said moving force is transmitted to the webbing through said transmitting means to thereby retract the webbing, wherein said base is solidly secured to a cylinder, through which said main shaft is extended, a compression coil spring is confined between a collar of said main shaft and the bottom of said cylinder to bias said main shaft in the axial direction thereof, the outer periphery of said collar is steeply tapered toward the bottom of said cylinder, a cap is crowned on the outer periphery of said collar, a ridge provided on said cap is in contact with the inner peripheral surface of said cylinder, and, when said collar is subjected to a force for moving it toward the bottom of said cylinder, said ridge is pressed against the inner peripheral surface of said cylinder, whereby a resistance is given when said main shaft returns.

* * * * *